US010257436B1

(12) United States Patent
Zhang et al.

(10) Patent No.: US 10,257,436 B1
(45) Date of Patent: Apr. 9, 2019

(54) METHOD FOR USING DEEP LEARNING FOR FACILITATING REAL-TIME VIEW SWITCHING AND VIDEO EDITING ON COMPUTING DEVICES

(71) Applicant: Adobe Systems Incorporated, San Jose, CA (US)

(72) Inventors: Jianming Zhang, Boston, MA (US); Zijun Wei, Stoneybrook, NY (US); Zhe Lin, Fremont, CA (US); Xiaohui Shen, Evanston, IL (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/730,632

(22) Filed: Oct. 11, 2017

(51) Int. Cl.
| | |
|---|---|
| *H04N 5/262* | (2006.01) |
| *G06K 9/00* | (2006.01) |
| *G06N 99/00* | (2010.01) |
| *H04N 5/222* | (2006.01) |

(52) U.S. Cl.
CPC ....... *H04N 5/2628* (2013.01); *G06K 9/00744* (2013.01); *G06N 99/005* (2013.01); *H04N 5/2224* (2013.01); *H04N 5/2228* (2013.01)

(58) Field of Classification Search
None
See application file for complete search history.

(56) References Cited

U.S. PATENT DOCUMENTS

| | | | |
|---|---|---|---|
| 9,325,899 B1* | 4/2016 | Chou | G06T 7/593 |
| 2015/0084951 A1* | 3/2015 | Boivin | H04N 5/272 |
| | | | 345/419 |
| 2015/0170405 A1* | 6/2015 | Hu | H04N 5/76 |
| | | | 345/427 |
| 2017/0132526 A1* | 5/2017 | Cohen | G06N 99/005 |
| 2017/0178289 A1* | 6/2017 | Zhang | H04N 5/23293 |
| 2017/0278546 A1* | 9/2017 | Xiao | H04N 5/911 |
| 2018/0032031 A1* | 2/2018 | Du | G06K 9/00671 |

* cited by examiner

*Primary Examiner* — Hoang Vu A Nguyen Ba
(74) *Attorney, Agent, or Firm* — Kilpatrick Townsend & Stockton LLP

(57) ABSTRACT

Various embodiments describe view switching of video on a computing device. In an example, a video processing application receives a stream of video data. The video processing application renders a major view on a display of the computing device. The major view presents a video from the stream of video data. The video processing application inputs the stream of video data to a deep learning system and receives back information that identifies a cropped video from the video based on a composition score of the cropped video, while the video is presented in the major view. The composition score is generated by the deep learning system. The video processing application renders a sub-view on a display of the device, the sub-view presenting the cropped video. The video processing application renders the cropped video in the major view based on a user interaction with the sub-view.

20 Claims, 6 Drawing Sheets

METHOD FOR USING DEEP LEARNING FOR FACILITATING REAL-TIME VIEW SWITCHING AND VIDEO EDITING ON COMPUTING DEVICES

TECHNICAL FIELD

This disclosure relates generally to video processing. More specifically, but not by way of limitation, this disclosure relates to a video processing application that uses a deep learning system to provide real-time view selection.

BACKGROUND

More and more people are using computing devices, e.g. smart phones, tablets and laptop computers, to access, play, and edit video. But despite the convenience, video customization, particularly view switching, remains difficult. View switching refers to changing the view of the video to focus on one particular area of the video, such as by cropping the video to zoom on a particular area of the video. For example, a user streams a video of a basketball game but wants to change the scene. View switching allows the user to quickly and seamlessly zoom in to a particular basketball player in the scene, or zoom out to view the entire court. Conversely, another user might focus on another element in the scene such as a second player.

Generally, view switching impacts the quality of the video composition. Composition refers to the way various elements in a scene are arranged within a video. Compositional quality refers to how well the presentation of the arrangement of the elements appear to a user. By switching from viewing the entire video to a particular area (e.g., from the entire basketball scene to only the player), the compositional quality is affected. The user's experience can be degraded if the compositional quality is degraded (e.g., if the switching views the body of the basketball player only without his head, the presented video would have a poor compositional quality).

Computing devices can assist a person in performing view switching, for example, via a user interface. But existing solutions do not recommend views with improved compositional quality in real-time and may unnecessarily use computing resources. Real-time refers to the ability to apply a customization within a timeframe that causes no perceptible delay to the user. For example, existing solutions may not be able to apply a real-time customization on a live video or a video stream such as a YouTube® video. Existing solutions may instead require cumbersome saving and subsequent editing of the video when otherwise unnecessary, thereby precluding broadcasting of the video to others or performing video customization in real-time. For example, the original video of the basketball scene is stored as a first video file. This file is edited to create another version that focuses on the player. This other version is stored as a second video file. In this way, a user can select the first video file to view the entire basketball court and can switch to the second video file to zoom onto the basketball player. Such solutions also unnecessarily consume resources such as processing power, memory, cache, and power because computing resources are required to generate, store, and transmit the different video files to support video customization for different users.

Accordingly, solutions are needed to help users quickly, easily, and efficiently perform view switching without wastefully consuming computing resources.

SUMMARY

Various embodiments of the present disclosure describe a video processing application that uses a deep-learning system to provide view switching for video on a device. In an example, the video processing application is executed on a device and receives a stream of video data. The video processing application renders a major view on a display of the computing device. The major view presents a video from the stream of video data. The video processing application inputs the stream of video data to the deep learning system. The video processing application receives, from the deep learning system, information that identifies a cropped video from the video based on a composition score of the cropped video, while the video is presented in the major view. The composition score is generated by the deep learning system. The video processing application renders a sub-view on a display of the device, the sub-view presenting the cropped video. The video processing application renders the cropped video in the major view based on a user interaction with the sub-view.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
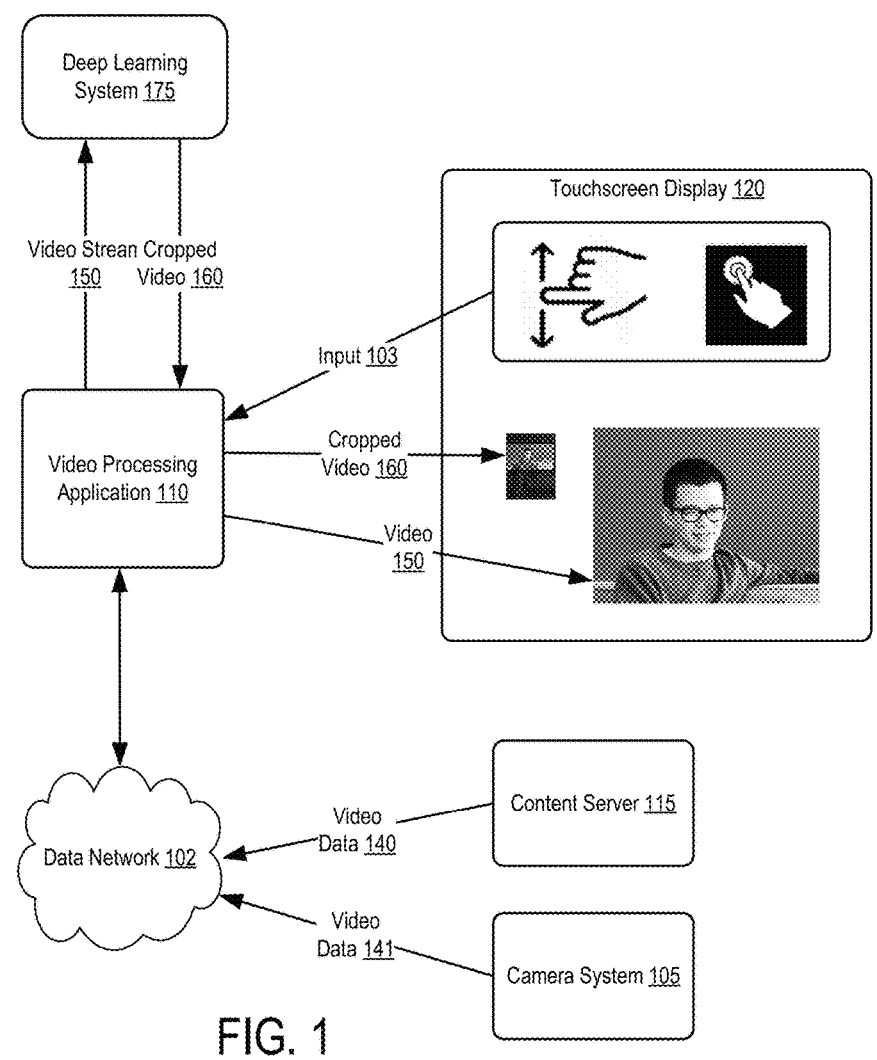
FIG. 1 is a diagram depicting an example computing device for providing view switching of video, according to some embodiments.

Embodiments of the present disclosure include systems and methods for view switching of videos on computing devices. View switching refers to changing the view of the video, such as cropping. As discussed above, existing solutions present disadvantages. Existing solutions may not provide suggestions that improve video composition, may not perform view switching in real-time relative to the presentation of the video, and may use resources inefficiently such as requiring the editing, storage, and transmission of multiple video files.

In contrast to existing solutions, embodiments of the present disclosure provide views for high-compositional quality crops for both live streams and previously recorded video, e.g., online streams. This functionality is provided while also improving the usage of the underlying computing resources. Unlike an existing system that stores multiple files of different versions of a video at a computing resource (e.g., a content server), storing only an original version of the file is sufficient. That file is transmitted to an end user device.

A video processing application customizes the presentation of the file at the end user device. For example, the original video is presented in a main window of a user interface at the end user device. The video processing application determines, in real-time, cropped videos from the original video, each having a high compositional quality. The cropped videos are suggested to the user at the user interface in real-time. In response to a user selection, the selected cropped video is presented in the main window. Hence, while existing systems rely on a centralized computing architecture, the embodiments of the present disclosure involve a distributed computing architecture. The centralized architecture necessitates editing and storing multiple versions and managing access of end user users thereto. In comparison, the distributed architecture is more computationally efficient. Under this architecture, it is sufficient to store and transmit the original video only. The video customization is performed in real-time on the end user devices. Hence, the distributed architecture reduces if not eliminates the computational overhead to manage the user access, while also allowing each user to customize the presented video in real-time.

The following non-limiting example is provided to introduce certain embodiments in which a computing system provides view switching of video. A video processing application operating on a computing device receives a video of a basketball game from a video source such as a camera system or a content server. The video processing application presents the video prominently on a user interface. The video processing application determines cropped video suggestions in real-time relative to receiving or presenting the video. A cropped video is an identified improvement at least one respect, such as providing an improved video composition or an alternative view. The cropped video can be generated upon the user's request or automatically by the video processing application.

For example, a cropped video might represent a better or alternative framing of the scene while maintaining the same aspect ratio as the original video. Maintaining the same aspect ratio means that the ratio of height to width of the cropped video is the same as the ratio of height to width of the original video. For example, some common aspect ratios are 16:9, 4:3, and 18:9. Aspect ratios may be predefined or correspond to a sub-view used to present a cropped video. A cropped video could be, for example, a zoomed-in view of a particular basketball player. Alternatively, a cropped video could be a zoomed-out view of the entire court. The user can switch the view of the video by choosing a cropped suggestion provided by the computing device. Therefore, a user can intelligently and seamlessly zoom into a particular player, or zoom out to view the entire court without interrupting recording.

The user can request feedback in the form of composition scores of the video and the cropped videos. The score can be an absolute score or a score relative between such videos. The computing device determines, in real-time, the composition scores, each of which indicates the relevant compositional quality. The computing device updates the composition scores as the video changes. The compositional quality can be based on features of the video. For example, if the video depicts a particular basketball player, but the basketball player moves further away from the camera, then a cropped video could be a zoomed-in version of the player. The cropped video may have a higher compositional score.

The user seeks feedback by pressing a button, tapping the screen, or using another touchscreen gesture. The feedback updates based on changes in the original video, or the user's selection of a sub-view. The video processing application can provide an indication as to whether the score of a suggested cropped video is higher or lower than an average composition score. The user can use the determined composition score to aid him/her in choosing a suggested crop.

As used herein, "video processing application" refers to an application executing on a computing device that facilitates taking or editing videos. Adobe After Effects®, available from Adobe Systems Inc., Mountain View, Calif. is an example of a video processing application.

As used herein, "composition score" refers to a numerical score representing the quality of the composition of a video at a given time. For example, a composition score can indicate the quality of a video at a given time relative to a threshold, which is be represented by a score of one. If a composition score is greater than one, the video is considered to have a good composition. Conversely, if a video has a composition score less than one, the video is considered to have a bad composition score. Videos can be ranked based on their composition score.

As used herein, "cropped video" refers to a cropped version of a video, the cropped version representing a different view or an improved or alternative composition relative to the video. For example, if a video shows a picture of a person's whole body, a cropped video could be a video of the person's head and shoulders only.

As used herein, "major view" refers to a predominant part of a user interface where a video can be displayed. For example, a major view can be a window of a user interface, where the window is used to present a primary video from a video stream.

As used herein, "sub-view" refers to a part of a user interface where a smaller version of a video can be displayed. For example, a sub-view can be available from a ribbon of a user interface and used to present a smaller sized video frame such as a suggested cropped video that the user can choose from instead of the original video.

As used herein, "composition indicator" refers to a user interface element that is capable of providing feedback as to the quality of a video composition. For example, a composition indicator could represent whether a given video composition is good, bad, above average, or below average.

FIG. 1 is a diagram depicting an example computing device for providing video view switching video, according to some embodiments. In the example depicted in FIG. 1, a user executes the video processing application 110 on the computing device 104. The computing device 104 can include a deep learning system 175.

The computing device 104 can receive and process video data from various sources. The computing device 104 can interface with video sources over data network 102. Data network 102 can be any kind of data network such as Ethernet, WiFi, LAN, WAN, mobile broadband, etc. The computing device 104 can receive video data 141 from a camera system 105. Camera system 105 is connected to the computing device 104 and the video processing application 110 by the data network 102. The received video data 141 represents a live stream broadcasted from the camera system. In another example, the computing device 104 receives an on-demand stream, such as video data 140 from a content server 115 over the data network 102. The video data 140 is already stored at the content server 115 and accessed on-demand.

Referring to the live stream broadcast, the video processing application 110 executing on the computing device 104 can provide a real-time display of a video from the stream of video data 141 to the user via the touchscreen display 120. In such embodiments, an operator of the camera system 105 points a camera of camera system 105 to a scene and the camera system 105 captures video data 141 representing a field of view of the camera and passes the video data 141 to the video processing application 110. The video processing application 110 sends the video data 141 to the touchscreen display 120 where the video 150 is displayed prominently on the user interface, for example, in a major view.

Referring to the on-demand stream, the video processing application 110 operates on a previously recorded video file and performs post-processing. For example, the computing device 104 and the video processing application 110 interface via the data network 102 to the content server 115. The video processing application 110 sends the video data 140 to the touchscreen display 120 where the video 150 is displayed prominently on the user interface, for example, in a major view.

Regardless whether the video stream is a live broadcast or on-demand, the video processing application 110 provides the received video (e.g., video data 140 or 141) to the deep learning system 175 in real-time relative to the reception or the presenting of this video. The video processing application receives information, also in real time, about cropped videos from the deep learning system. The video processing application 110 presents some or all of the information about the cropped videos at the touchscreen display 120 and allows user interactions with such cropped videos.

In an example, operations such as determining the cropped video or providing real-time feedback based on the video are performed by a deep learning system. The deep learning system can operate on the computing device, or on another, remote computing device such as a server. An example deep learning system is described in co-pending U.S. patent application Ser. No. 15/730,564, which is incorporated herein by reference in its entirety. Briefly, the deep learning system includes an evaluation network and a proposal network, both of which are trained to evaluate video compositions. The evaluation network takes a video as an input and outputs an evaluation score that indicates its compositional quality. The proposal network takes a video as an input and outputs as a recommendation video crops from the video and their ranking based on predefined crop areas.

In an example, presenting the information about the cropped videos and allowing the user interactions therewith includes providing view switching and editing in different ways. The video processing application 110 provides a switch view feature to suggest cropped videos from the video. The switch view feature provides instant compositional suggestions of cropped videos with the same aspect ratios as the video. When the video processing application 110 performs the switch view feature, the user can quickly and easily use touch gestures or other commands to switch to different views of a scene. The video processing application 110 provides several suggested cropped videos to the user. For example, a cropped video might accentuate or deemphasize part of a scene to obtain a better composition. Alternatively, the user can set predefined sizes, and the video processing application 110 determines the best cropped video for a given frame size.

The video processing application 110 receives information about the cropped video from the deep learning system 175. In some embodiments, the video processing application 110 receives the cropped video itself from the deep learning system 175. In other embodiments, the deep learning system 175 sends pixel locations that indicate a boundary of sub-area of the video. For example, the video processing application 110 uses the pixel boundaries to determine the crop. In further embodiments, the deep learning system 175 sends an indicator that indicates the surrounding one of the additional cropped videos, for example, using a pre-defined identifier. In this case, the video processing application 110 looks up the indicator in a table to determine the pixel boundaries for the crop.

The video processing application 110 can also determine a cropped video based on a zoom view feature. The zoom view feature provides the user an easy way to perform content-aware zoom. The video processing application 110 can evaluate objects or features captured within the video. Alternatively, the video processing application 110 can use the zoom view feature to crop the video based on a detected distance from the camera to the subject. For example, if the video depicts a person, the smart zoom feature can suggest a cropped video in which the user's face is positioned prominently. The video processing application 110 can also suggest a cropped video which is zoomed out, for example, showing a person and the scene around the person.

In some embodiments, the suggested cropped videos are determined by ranking various possibilities for cropped video according to each possibility's composition score at a given time and providing the highest-scoring cropped videos to the touchscreen display 120. Other methods are possible.

Suggestions for cropped video can be displayed on the user interface in different ways. For example, an automatically generated cropped video can be displayed in a sub-view of the user interface on the touchscreen display 120. With the cropped video 160 present on the touchscreen display 120, the user can choose to select the cropped video 160, for example, by providing the an input 103 to the touchscreen display 120. In that case, the video processing application 110 causes the cropped video to be displayed prominently in the major view of the touchscreen display 130.

The user can interact with the video processing application 110 by providing inputs 103 to the touchscreen display 120, or by other methods. Inputs can be standard touch-screen gestures such as taps, swipes, etc. In some embodiments, the user can cause the video processing application 110 to provide view suggestions. In other embodiments, the video processing application 110 automatically provides view suggestions to the user. The touchscreen display 120 is operable to present a user interface that permits the user to interact with the video processing application 110 in a variety of manners, such as pressing a button or providing a user gesture to the screen (e.g., such as tap, pinch, stretch, zoom, rotate, swipe, etc.). The video processing application 110 maps predefined gestures to an appropriate command internally via the use of a table stored in a memory. For example, a swipe left can be mapped to a command that indicates that the user wishes to swap the video with the cropped video displayed in a sub-view immediately to the left.

More specifically, a touch screen interface provides data to the video processing application 110, which uses the data to interpret the gesture as a recognized gesture. The video processing application 110 looks up the gesture in a table in order to determine the user's desired command. The video processing application 110 applies the command to achieve the user's desired result. For example, the table includes a mapping for each of three kinds of gestures: a swipe left or right, a swipe up or down, and a tap. For example, an entry in the table maps a swipe left or right to an action such as iterating through a set of videos displayed in sub-views. Another table entry maps a swipe up and a swipe down to a zoom in and zoom out operation respectively. Another table entry maps a tap operation on a button to an action for displaying a composition score indicating the composition quality of the currently displayed video.

In other embodiments, additional processing devices such as application processors, or additional applications or an operating system can be used to interpret touch gestures. Additionally, the user can interact with the video processing application 110 by using features designed for accessibility.

The operations described herein can also be performed on images or photos. An example system described in co-pending U.S. patent application Ser. No. 15/730,614, which is incorporated herein by reference in its entirety. Briefly, the user can request a suggested cropped image. For example, a user can swipe left or right in order to toggle between different suggested cropped images. A user can also swipe up or down to toggle between different intelligent zoom suggestions for cropped images. For example a swipe up causes the computing device to zoom in, and a swipe down causes the computing device to zoom out of the currently previewed image.

A computing device 104 executes the video processing application 110 and can also host a deep learning system 175, which can perform some or all of the functionality described herein, such as suggesting cropped videos or measuring composition scores. In some embodiments, the neural networks of the deep learning system 175 are trained by a server and, once the training is complete, such neural networks transmitted from the server to the computing device 104. In such embodiments, updates to the deep learning system 175 can be also pushed to the computing device 104 from the server. In yet other embodiments, the deep learning system 175 is executed by a server, for example, on a remote device. The computing device 104 and deep learning system 175 can be connected by a network, for example.

The user can save the video as edited over time to a storage device, such as a disk or server. For example, the computing device 104 can save an edited video consisting of the original, unedited video for the first ten seconds of a basketball game followed by fifteen seconds of a particular player, and then another twenty seconds of the original, unedited footage.

In some embodiments, the video processing application 110 provides cropped videos with the use of tracking features. For example, the video processing application 110 can automatically suggest crops that display certain objects or persons of interest more prominently in a scene. For example, a user wishes to follow a particular player as that player moves around the court, or to follow the player with the ball.

In further embodiments, the video processing application may operate as a distributed computing system. For example, the video processing app can be running on the content server 115 and the camera system 105. More specifically, an instance of the video processing application 110 can run on the device and provides an interface to the functionality hosted on the content server 115 and the camera system 105.

Figure 2:
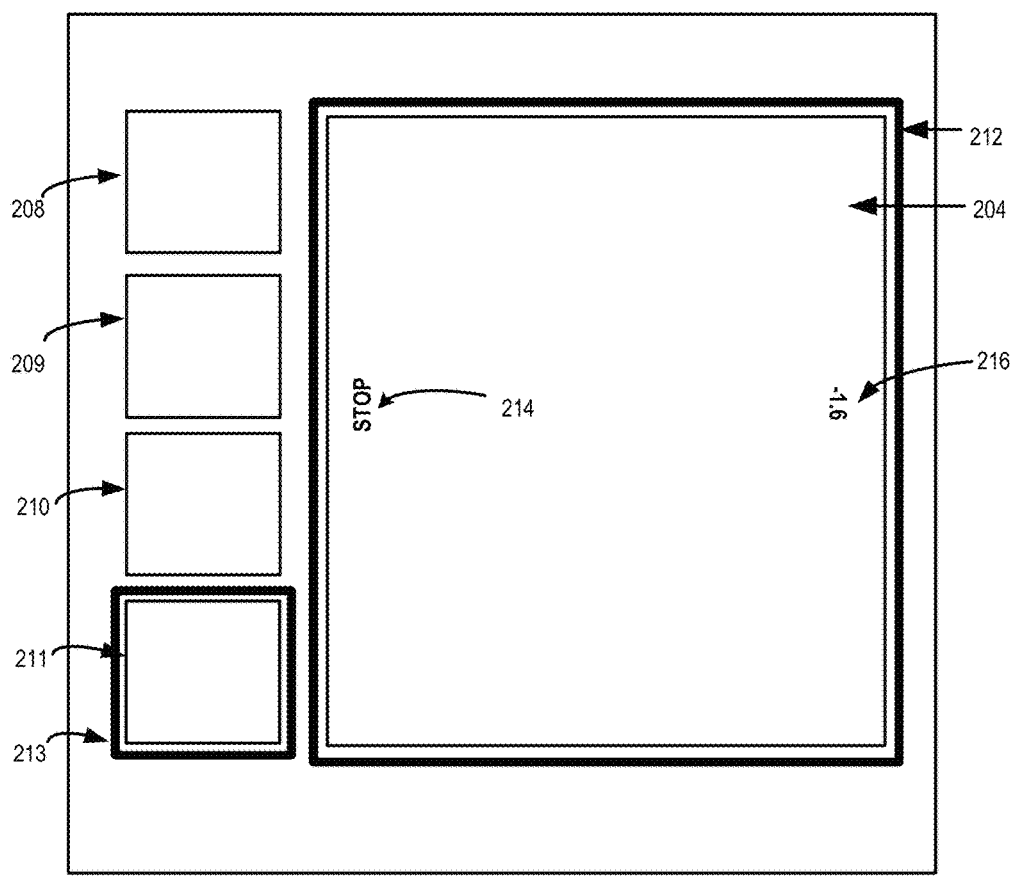
FIG. 2 is a diagram depicting an example user interface for providing view switching of video, according to some embodiments.

FIG. 2 is a diagram depicting an example user interface for guiding video composition, according to some embodiments. FIG. 2 depicts a user interface 200 including major view 204 and sub-views 208-211. The major view 204 displays a video prominently. The major view 204 is typically larger than sub-views 208-211. Each of the sub-views 208-211 is typically smaller than the major view 204.

The sub-views 208-211 are available to display cropped videos, based on information received from the deep learning system 175. While four sub-views are shown in FIG. 2, any number of sub-views is possible. One or more sub-views 208-211 can be highlighted by an identifier such as 213. The identifier can indicate particular characteristics about an video in a given sub-view 208-211, for example, that the particular sub-view 208-211 is currently selected. The identifiers can be a box around the corresponding video, a color, shading, etc.

User interface 200 includes a composition indicator 216 that provides the composition score of the video. The compositional quality feedback of the video can be determined based on features of a video. The composition score can be an absolute score, or a relative score compared to previous videos or other suggested cropped videos. Additionally, feedback can be provided by a box 212 around the major view 204. Feedback can also be provided to the user in the form of vibration, haptic, or audio feedback.

User interface 200 can provide standard video functions. For example, stop button 214 can stop the video being captured or stored by the video processing application 110. In other embodiments, a stop button 214 causes the camera system 105 to stop recording video. In some embodiments, the user can invoke other features such as red eye reduction, touchup, filters, or manual cropping.

By interacting with the user interface 200, the user can receive automatic suggestions of cropped videos determined by the computing device 104 to have improved composition or that provide alternate views. For example, the video processing application 110 can display the cropped videos in the sub-views 208-211 as suggestions to the user. Each sub-view 208-211 can display a different suggested cropped video available for switching by the user.

The user can select a sub-view using the touch screen or using another touch gesture. The selected cropped video will be displayed more prominently on the display, for example, in the major view. In some embodiments, one of the sub-views 208-211 is selected and corresponds to the video in the major view. For example, indicator 213 indicates to the user that the major view 204 is currently displaying the cropped video suggestion depicted in sub-view 211.

The user can interact with the user interface 200 via the touchscreen display 120 in a variety of manners. As discussed herein, the user can manually invoke features such as switch view or zoom view.

The switch view feature suggests cropped videos from the video. The switch view feature provides instant compositional suggestions of cropped videos with the same aspect ratios, scaled from the video. When the computing device 104 is performing the switch view feature, the user can quickly and easily use touch gestures or other commands to display and capture different views of a scene. The user interface 200 can suggest several suggested cropped videos to the user. For example, a cropped video might accentuate or deemphasize part of a scene to obtain a better composition. To select a cropped video, the user can simply tap on one of the sub-views 208-211 to select the cropped video displayed in that sub-view. Alternatively, the user can set predefined sizes, and the computing device 104 determines the best cropped video for a given size.

The zoom view feature provides the user an easy way to perform content-aware zoom. The user can invoke zoom-view by swiping up or down. For example, a swipe up causes the computing device 104 to zoom in, and a swipe down causes the computing device 104 to zoom out. The resulting cropped videos can be based on features of the video. For example, if the video is capturing a person, the zoom view feature can transition from the video to a zoomed video in which the user's face is positioned prominently. Alternatively, the computing device 104 can use the zoom view feature to crop the video based on a detected distance from the camera to the subject. For example, using the zoom view feature, the computing device 104 determines that the detected distance from the camera to the subject is too large, and upon the user's command, zoom out to a video with improved composition.

When the user is finished capturing video, he/she may press the stop button 214 and the video processing application 110 ceases to capture or store video and ceases to provide cropped video suggestions.

Figure 3:
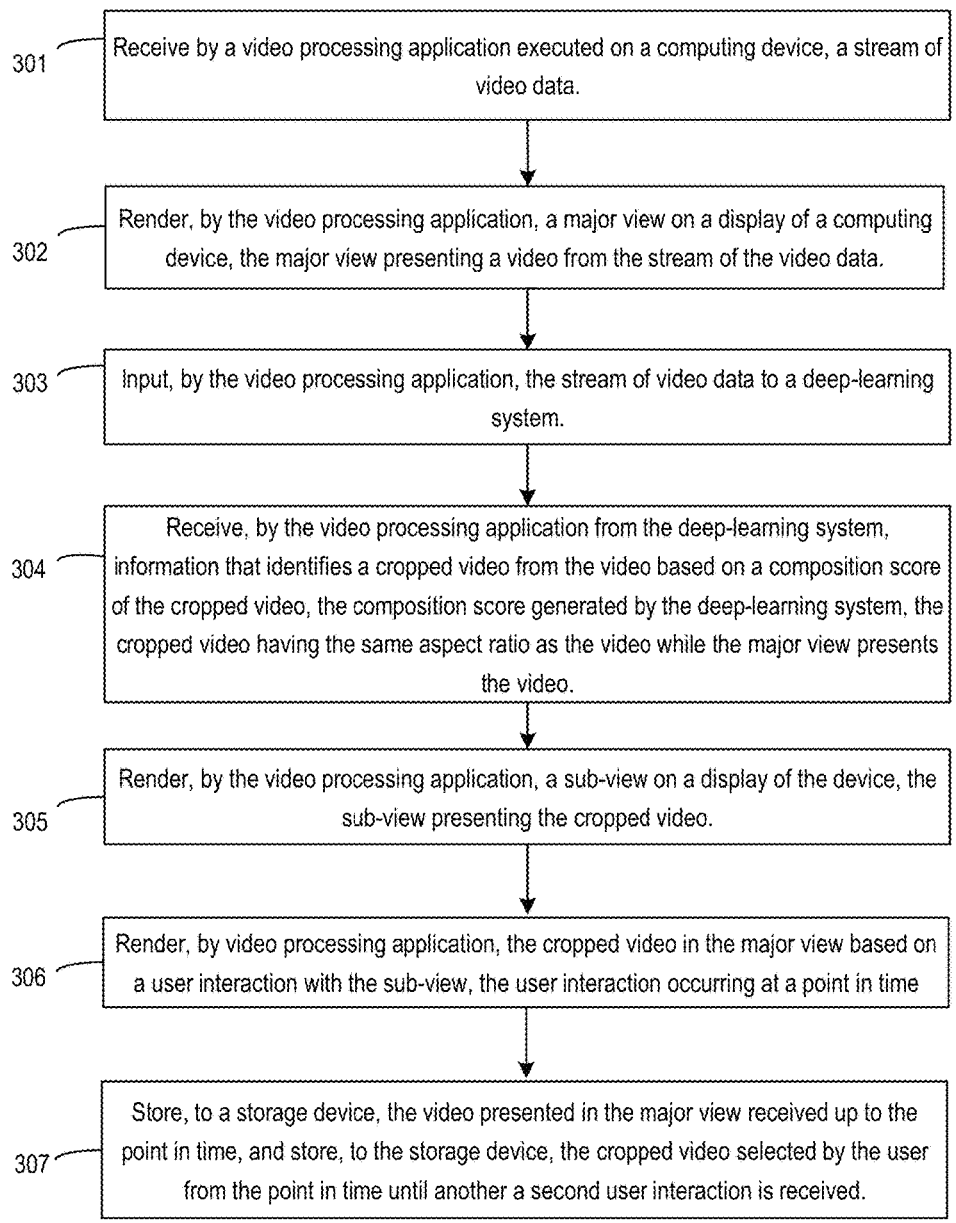
FIG. 3 is a flow chart depicting example operations performed in conjunction with providing view switching of video, according to some embodiments.

FIG. 3 is a flow chart depicting example operations performed in conjunction with providing view switching of video, according to some embodiments. At block 301, method 300 involves receiving, by a video processing application executed on a computing device, a stream of video data. The computing device 104 receives video data from a camera system 105, from a content server 115, or from another device. Video data received from the camera system 105 can be captured in real-time and be edited in real-time by the computing device 104. More specifically, the video processing application 110 can receive and buffer the video. The video processing application 110 can send the buffered video to the deep learning system 175 and obtain suggested video crops before a buffered version of the video is presented to the user.

At block 302, method 300 involves rendering, by the video processing application, a major view on a display of the device, the major view presenting a video from the stream of the video data. The major view can present the video currently being edited or recorded, that is, the video that will receive any edits from the computing system.

At block 303, method 300 involves inputting, by the video processing application, the stream of video data to a deep learning system. As discussed herein, deep learning techniques can be used to analyze the video and determine recommended views and edits from which the user can choose. The video processing application 110 provides the video data from the video data source, e.g., the camera system 105 or the content server 115, to the deep learning system 175.

At block 304, method 300 involves receiving, by the video processing application from the deep learning system, information that identifies a cropped video from the video based on a composition score of the cropped video, the composition score generated by the deep learning system, the cropped video having the same aspect ratio as the video. The deep learning system 175 analyzes the video data and determines recommended views and edits.

The deep learning system 175 can determine a composition score at a given time for a video. The cropped video suggestions identified by the deep learning system can be updated accordingly. The composition score will change as the scene changes and thus is updated, causing cropped video suggestions to also be updated.

As discussed, the computing device 104 is configured to provide view switching and editing in different ways. For example, the computing device 104 provides a switch view feature to suggest cropped videos from the video. The switch view feature provides instant compositional suggestions of cropped videos with the same aspect ratios as the video. The computing device 104 can also determine a cropped video based on a zoom view feature. The zoom view feature uses a smart zoom to provide the user with intelligent zoom suggestions, such as zooming in directly to the face of a person, or zooming out to view the entire sports field. In some embodiments, the suggested cropped videos are determined by ranking various possibilities for cropped video according to each possibility's composition score at a given time.

The deep learning system 175 can communicate the cropped video to the computing device 104 and the video processing application 110 in different ways. For example, the deep learning system 175 can provide the video processing application with the cropped video stream. In this embodiment, the editing is performed on the deep learning system 175 or related systems, relieving the computing device 104 from the burden of performing cropping. But this method can lead to higher network bandwidth use in some scenarios. Alternatively, the deep learning system 175 can provide the pixel locations of the crop, e.g., the pixel coordinates for each corner of a rectangular area representing the crop, to the video processing application 110. In yet other embodiments, the deep learning system 175 can send an identifier to the video processing application 110. The identifier can identify the crop, for example, using a lookup table on the video processing application 110.

At block 305, method 300 involves rendering, by the video processing application, a sub-view on a display of the device, the sub-view presenting the cropped video. The computing device 104 renders the cropped video on one of the sub-views 208-211 of the touchscreen display 120. The user can quickly and easily select, for example, from a sub-view, the desired cropped video.

At block 306, method 300 involves rendering, by video processing application, the cropped video in the major view based on a user interaction with the sub-view, the user interaction occurring at a point in time. Upon receiving a selection, the computing device 104 then displays the cropped video in the major view 204. In some embodiments, multiple sub-views 208-211 are used. Each sub-view can show a different cropped video. For example, sub-view 208 could show a version of the video zoomed in on a person's face and sub-view 209 could show a zoomed-out version of the person's head, face, and shoulders.

At block 307, method 300 involves storing, to a storage device, the video presented in the major view received up to the point in time, and storing, to the storage device, the cropped video selected by the user from the on time until another a second user interaction is received. For example, the user indicates to the video processing application that he/she wishes to store the video. The video processing application stores the video from the major view. That is, the video processing application stores the video from before the user interaction caused the cropped video to be selected and displayed in the major view, and the video from the selected cropped video after the user interaction until at some point the user makes a second user interaction.

Method 300 can be used to crop video that is broadcasted in real-time or that is accessed on demand, where the cropping operations is performed in real-time relative to the device receiving or presenting the video. For the live broadcast, method 300 is used to receive the live stream, present the live stream in a major view, present cropped video in sub-view, receive a user selection of the cropped video, switch the presentation of the cropped video to the major view, and store one video file of the video data that was presented in the major view over time. For the on-demand stream, method 300 is used to receive the video content, present the video in the major view, present cropped video in sub-view, receive a user selection of the cropped video, switch the presentation of the cropped video to the major view, and store one video file of the video data that was presented in the major view over time.

Figure 4:
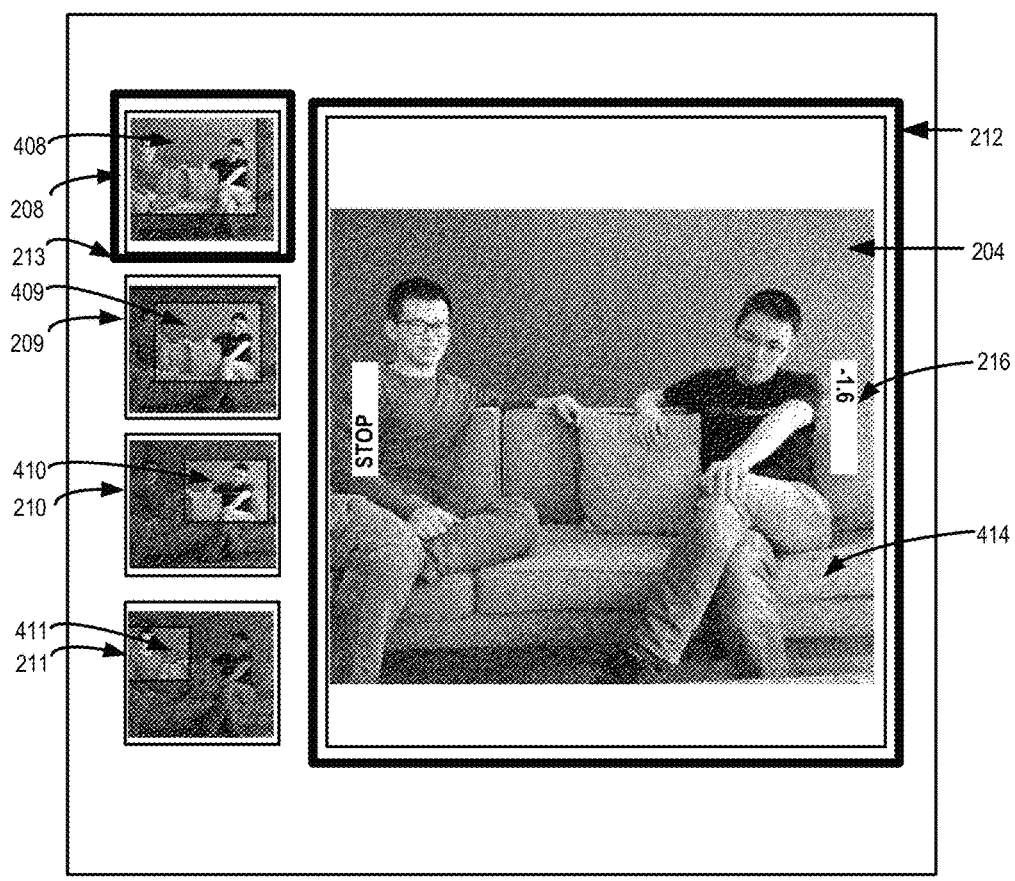
FIG. 4 is a diagram depicting an example user interface depicting the use of view switching on video, according to some embodiments.

FIG. 4 is a diagram depicting an example user interface depicting the use of real-time view switching on video, according to some embodiments. FIG. 4 depicts a user interface 400 including major view 204 and sub-views 208-211. The sub-views 208-211 are available to display suggested cropped videos suggested by the deep learning system 175. While four sub-views are shown in FIG. 4, any number of sub-views is possible.

Major view 204 shows a still image, or frame, of the video stream. The major view 204 represents the video currently being captured, or stored. In this case, major view 204 shows an image of two people sitting on a couch. In some embodiments, composition indicator 216 can be displayed. The composition indicator 216 provides immediate quantitative feedback on the quality of the composition of a given video frame. The composition indicator 216 is updated when the composition score changes, for example when the view or the scene changes.

FIG. 4 shows all four sub-views 208-211 showing cropped videos 408-411 respectively. Cropped videos 408-411 provide different views from which the user can select. For example, cropped video 408 displayed in sub-view 208 depicts a cropped version of the video in the major view 204. The cropped video 408 does not depict extraneous background and is focused in on the two individuals in the photo. In contrast, cropped video 410, displayed in sub-views 210, does not depict the individual on the left. Cropped video 411, displayed in sub-view 211, does not depict the individual on the right. By selecting a sub-view 208-211, the user selects the corresponding cropped video of the cropped videos 408-411 and the computing device 104 provides a seamless, smooth transition between the video crops.

One or more sub-views 208-211 can be identified by an indicator 213. Indicator 213 is shown as a box but can be a color, shading, or some other indicator. The identifier indicates particular characteristics about an video in a given sub-view 208-211, for example, that a particular sub-view 208-211 is currently selected, or is a preferred option. For example, in FIG. 4, indicator 213, a box around sub-view 208, indicates that cropped video 408 is recommended to the user.

Figure 5:
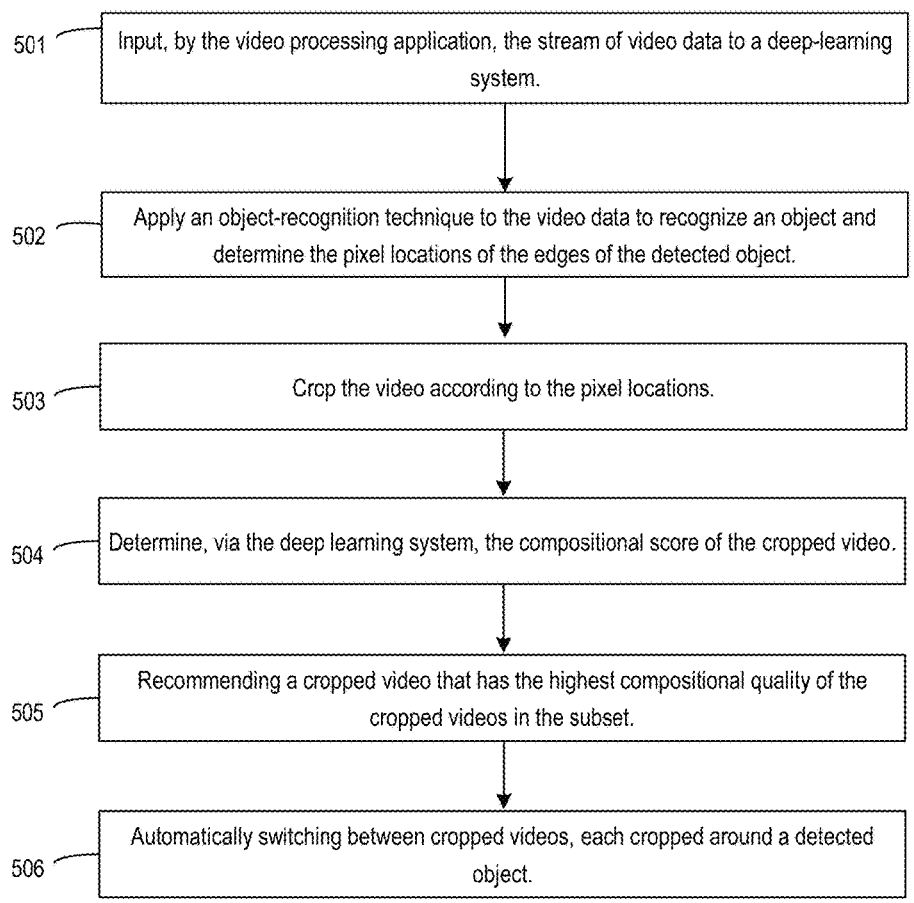
FIG. 5 is a flow chart depicting example operations performed in conjunction with providing view switching of video based on object recognition, according to some embodiments.

FIG. 5 is a flow chart depicting example operations performed in conjunction with providing view switching of video based on object recognition, according to some embodiments. Object recognition and tracking can be performed in conjunction with maintaining good compositional quality of video.

At block 501, method 500 involves inputting, by the video processing application a stream of video data to a deep learning system. The video processing application 110 can use object recognition to determine the an object and its context. Context could include, for example, the edges of the objects or the location of the edges in the video frame. From the object and the context, the video processing application 110 can determine cropped videos with improved compositional scores.

At block 502, method 500 involves applying an object recognition technique to the video data to recognize an object. The video processing application 110 can use different techniques, for example, feature-based algorithms, appearance-based algorithms, edge detection algorithms, histogram-based algorithms, and/or other algorithms well known in the art for object detection may be used. With an object identified, the video processing application 110 can determine a suggested cropped video by performing operations described in blocks 504-506, for example.

At block 504, method 500 involves cropping the video according to the pixel locations. Based on the already detected object, the video processing application 110 determines the edges of the object and the location of the edges within each video frame. The video processing application 110 also accesses a table of all potential crop areas. The video processing application 110 uses the table to identify the subset of crop areas that fully contain the object. Each crop area define the boundaries (e.g., pixel locations) of a cropped video.

At block 505, method 500 involves recommending a cropped video that has the highest compositional quality of the cropped videos in the subset. To determine compositional scores of videos and, thus recommend the cropped video, the video processing application 110 uses the deep learning system 175. Different methods are possible for determining the compositional scores. For example, the video processing application 110 sends the video stream to the deep learning system 175. The video processing application 110 receives compositional scores for all the possible cropped areas, and determines, the scores applicable to potential crop areas that contain the object, and selected the cropped video with the best score from the applicable scores.

Alternatively, the video processing application 110 sends the video stream with embedded information (e.g., identifiers of the potential cropped areas) to the deep learning system 175. The deep learning system returns the scores of only the subset of cropped videos that fully contain the object or an identifier of the best cropped video in that subset.

At block 506, method 500 involves automatically switching between cropped videos, each cropped around a detected object. To do so, the video processing application maintains a table that shows the compositional scores of the cropped video and of other possible cropped videos around other objects (such videos would also have the best compositional scores and would be identified as in the previous blocks of method 500). These cropped videos are referred to herein as possible cropped videos in the interest of clarity of explanation and each represent a video cropped from the original video around a detected object and having the best compositional score of a crop that includes the detected object.

If the compositional score of the possible cropped video drops below a threshold (indicating that the compositional quality has degraded), the application can suggest or automatically select and present one of the other possible cropped videos. For example, the application selects the possible cropped video that has the highest compositional score.

At block 506, method 500 involves based on the compositional score, providing the cropped video for display in a sub-view. Based on the determined compositional score, the deep learning system 175 can recommend or decline to recommend a cropped video to the user. If the compositional score is insufficient to provide a video with an improved compositional score relative to the current video, i.e., the video displayed in the major view 204, the deep learning system can start the process again, for example, at block 502.

In an example, the threshold is predefined as a particular score value. In another example, the threshold is dynamically defined as a function (e.g., the average) of the compositional scores of the various possible cropped videos.

Figure 6:
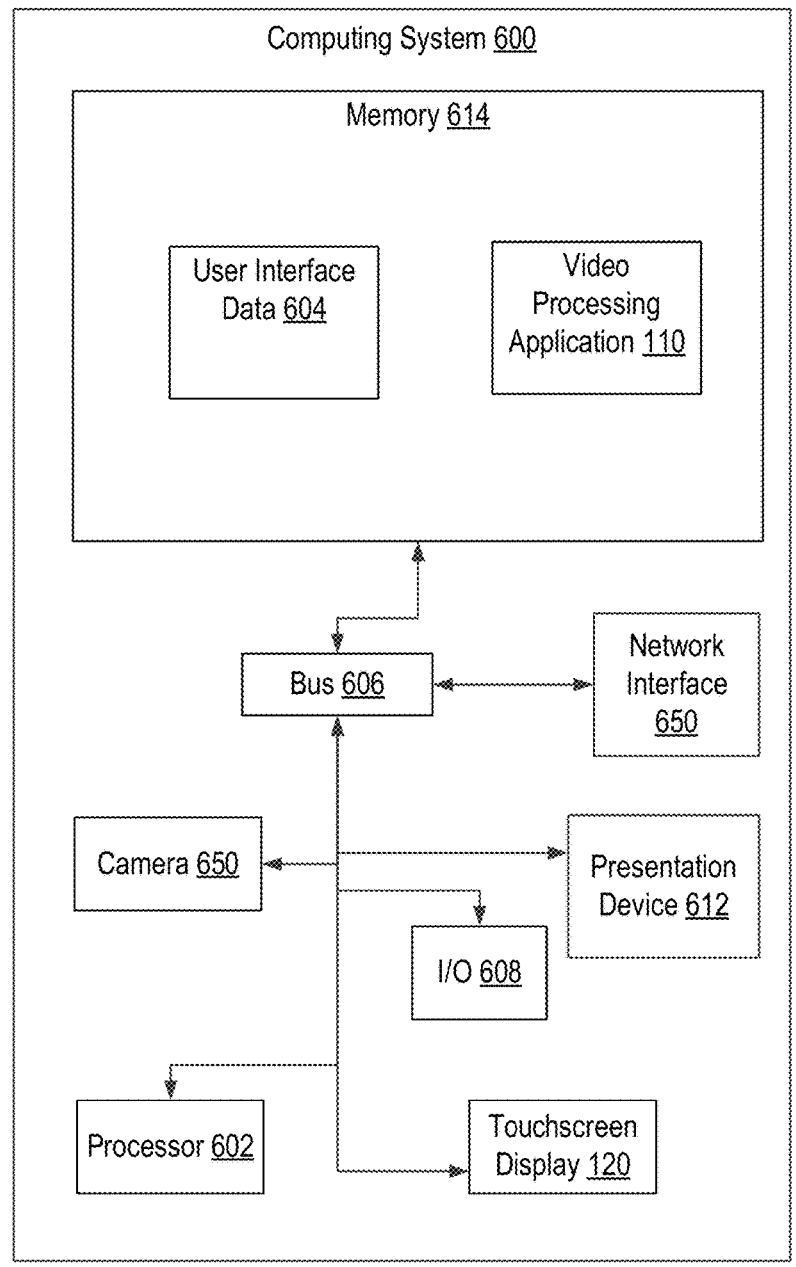
FIG. 6 is a diagram depicting an example computing system for performing view switching on video, according to some embodiments.

FIG. 6 is a diagram depicting an example computing system for performing view switching on video, according to some embodiments. Some or all of the components of the computing system 600 can belong to the computing device 104 of FIG. 1. For example, the video processing application 110 can operate on the computing system 600. The computing system 600 includes one or more processors 602 communicatively coupled to one or more memory devices 614. The processor 602 executes computer-executable program code, which can be in the form of non-transitory computer-executable instructions, stored in the memory device 614, accesses information stored in the memory device 614, or both. Examples of the processor 702 include a microprocessor, an application-specific integrated circuit ("ASIC"), a field-programmable gate array ("FPGA"), or any other suitable processing device. The processor 702 can include any number of processing devices, including one.

The memory device 614 includes any suitable computer-readable medium such as electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 600 may also include a number of external or internal devices such as input or output devices. For example, the computing system 600 is shown with an input/output ("I/O") interface 608 that can receive input from input devices or provide output to output devices. A bus 606 can also be included in the computing system 600. The bus 606 can communicatively couple one or more components of the computing system 600 and allow for communication between such components.

The computing system 600 executes program code that configures the processor 602 to perform one or more of the operations described above with respect to FIGS. 1-5. The program code of the video processing application 110, which can be in the form of non-transitory computer-executable instructions, can be resident in the memory device 614 or any suitable computer-readable medium and can be executed by the processor 602 or any other one or more suitable processor. Execution of such program code configures or causes the processor(s) to perform the operations described herein with respect to the computing device 104. In additional or alternative embodiments, the program code described above can be stored in one or more memory devices accessible by the computing system 600 from a remote storage device via a data network. The computing device 54 and any processes can use the memory device 614. The memory device 614 can store, for example, additional programs, or data such as user interface data 604, used by the applications executing on the processor 602 such as the video processing application 110. User interface data 604 can include, for example, a table mapping gestures to commands.

The computing system 600 also includes at least one network interface 650. The network interface 650 includes any device or group of devices suitable for establishing a wired or wireless data connection to one or more data networks. Non-limiting examples of the network interface 650 include an Ethernet network adapter, a modem, and/or the like. The computing system 600 is able to communicate with one or more other computing devices or computer-readable data sources via a data network using the network interface 610.

The computing system 600 includes touchscreen display 120. The touchscreen display 120 provides the user an intuitive way to interact with the computing system 600 such as by touching, tapping, swiping, or using other suitable gestures to select objects and user interface elements.

The computing system 600 includes a presentation device 612. A presentation device 612 can include any device or group of devices suitable for providing visual, auditory, or other suitable sensory output. Non-limiting examples of the presentation device 612 include a monitor, a speaker, a separate mobile computing device, etc.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes poses of example rather than limitation, and does not preclude the inclusion of such modifications, variations, and/or additions to the present subject matter as would be readily apparent to one of ordinary skill in the art.

The invention claimed is:

1. A computer-implemented method for facilitating real-time view switching and video editing, the method comprising:
  receiving, by a video processing application executed on a computing device, a stream of video data;
  rendering, by the video processing application, a major view on a display of the computing device, the major view presenting a video from the stream of video data;
  inputting, by the video processing application, the stream of video data to a deep learning system;
  receiving, by the video processing application and from the deep learning system, a composition score and information that identifies a cropped video from the video based on the composition score the composition score generated by the deep learning system while the video is presented in the major view, the cropped video having a same aspect ratio as the video;
  rendering, by video processing application, the cropped video in the major view; and
  updating, by the video processing application, the composition score in real-time, wherein the updated composition score is based on an updated stream of video data provided to the deep learning system.

2. The method of claim 1, further comprising:
  receiving, by the video processing application, a first user interaction from a user at a point in time, the first user interaction comprising a cropped video selection;
  storing, by the video processing application to a storage device, the video presented in the major view received up to the point in time; and
  storing, by the video processing application to the storage device, the cropped video selected by the user until a second user interaction is received.

3. The method of claim 1, wherein the video is stored at a content server and is streamed to computing devices of a first user and a second user, the method further comprising:
  receiving, by the video processing application, a first cropped video selection of the first user; and
  storing, by the video processing application to a storage device, a first edited version, wherein the first edited version comprises a first cropped video based on the first cropped video selection and is different from a second edited version based on a second cropped video selection of the second user.

4. The method of claim 1, wherein the information comprises an identifier of a predefined cropped area, the method further comprising determining pixel locations of the cropped area based on a lookup table that is accessible to the video processing application and that comprises an entry for the identifier and an entry for the predefined cropped area.

5. The method of claim 1, wherein the information comprises the cropped video.

6. The method of claim 1, wherein the information comprises pixel locations of a boundary of an area within the video.

7. The method of claim 1, further comprising:
  rendering, by the video processing application, a sub-view on the display of the computing device, the sub-view presenting the cropped video; and
  rendering a plurality of additional sub-views, each additional sub-view comprising an additional cropped video, wherein each additional cropped video is updated in real-time and wherein each sub-view is indicated by an identifier surrounding one of the additional cropped videos.

8. The method of claim 7, further comprising:
  receiving, by the video processing application, a selection of an additional sub-view; and
  rendering, by the video processing application, the additional cropped video corresponding to the additional sub-view within the major view.

9. The method of claim 1, wherein the video comprises an object and wherein determining the cropped video is based at least in part on recognizing the object in the video.

10. The method of claim 1, wherein the video processing application and the deep learning system are executed by the computing device.

11. The method of claim 1, wherein the video comprises an object, further comprising:
  recognizing, by the video processing application, the object in the video;
  receiving, by the video processing application from the deep learning system, a first compositional score representing a first cropped video and a second compositional score representing a second cropped video, wherein the first and second cropped videos contain the object; and
  based on the second compositional score being higher than the first compositional score, selecting, by the video processing application, the second cropped video for presentation on the display of the computing device.

12. The method of claim 1, wherein the video comprises a first object and a second object, the method further comprising:
  rendering, by the video processing application, a sub-view on the display of the computing device, the sub-view presenting the cropped video;
  receiving, by the video processing application, scores from the deep learning system about a first cropped video with a first compositional score and a second cropped video with a second compositional score, the first cropped video comprising the first object, the second cropped video comprising the second object; and
  based on the second compositional score being higher than the first compositional score, presenting, by the video processing application, the second cropped video in the sub-view instead of the first cropped video.

13. The method of claim 1, further comprising:
  rendering, by the video processing application, a sub-view on the display of the computing device, the sub-view presenting the cropped video;

receiving, by the video processing application, a user interaction from a user at a point in time, the user interaction comprising a cropped video selection;

storing, by the video processing application to a storage device, the video presented in the major view received up to the point in time; and storing, by the video processing application to the storage device, the cropped video selected by the user until another a second user interaction is received.

14. A system comprising:
a display;
a non-transitory computer-readable medium storing computer-executable instructions of a video processing application; and
a processing device communicatively coupled to the computer-readable medium for executing the computer-executable instructions, wherein executing the computer-executable instructions configures the system to perform operations comprising:
receiving a stream of video data;
rendering a major view on the display, the major view presenting a video from the stream of video data;
inputting the stream of video data to a deep learning system;
receiving, from the deep learning system, a composition score and information that identifies a cropped video from the video based on the composition score of, the composition score generated by the deep learning system while the video is presented in the major view;
rendering the cropped video in the major view; and
updating, by the video processing application, the composition score in real-time, wherein the updated composition score is based on an updated stream of video data provided to the deep learning system.

15. The system of claim 14, wherein the cropped video has a same aspect ratio as the video.

16. The system of claim 14, wherein the information comprises the cropped video.

17. The system of claim 14, the operations further comprising:
receiving a user interaction from a user at a point in time, the user interaction comprising a cropped video selection;

storing, to a storage device, the video presented in the major view received up to the point in time; and storing, to the storage device, the cropped video selected by the user until another a second user interaction is received.

18. A non-transitory computer-readable storage medium storing instructions for a video processing application, the instructions upon execution on a computing device cause the computing device to perform operations comprising:
receiving a stream of video data;
rendering a major view on a display of the computing device, the major view presenting a video from the stream of video data;
inputting the stream of video data to a deep learning system;
receiving, from the deep learning system, a composition score and information that identifies a cropped video from the video based on the composition score, the composition score generated by the deep learning system while the video is presented in the major view, the cropped video having a same aspect ratio as the video;
rendering the cropped video in the major view; and
updating, by the video processing application, the composition score in real-time, wherein the updated composition score is based on an updated stream of video data provided to the deep learning system.

19. The non-transitory computer-readable storage medium of claim 18, wherein the video comprises an object and wherein determining the cropped video is based on recognizing the object in the video.

20. The non-transitory computer-readable storage medium of claim 18, wherein the video is stored at a content server and is streamed to computing devices of a first user and a second user, the operations further comprising:
receiving a first cropped video selection of the first user; and
storing, to a storage device, a first edited version, wherein the first edited version comprises a first cropped video based on the first cropped video selection and is different from a second edited version, the second edited version based on a second cropped video selection of the second user.

* * * * *